United States Patent [19]

Radici

[11] Patent Number: 4,530,980
[45] Date of Patent: Jul. 23, 1985

[54] METHOD OF COPOLYMERIZATION IN SUSPENSION OF ETHYLENE WITH STRAIGHT-CHAIN ALPHA-OLEFINS TO OBTAIN LOW-DENSITY COPOLYMERS

[75] Inventor: Pierino Radici, Turate, Italy

[73] Assignees: Societa Italiana Resine S.T.R. S.p.A.; Enichimica Secondaria S.p.A, both of Italy

[21] Appl. No.: 579,052

[22] Filed: Feb. 10, 1984

[30] Foreign Application Priority Data

Feb. 10, 1983 [IT] Italy .............................. 19521 A/83

[51] Int. Cl.$^3$ ................................................ C08F 2/00
[52] U.S. Cl. ..................................... 526/73; 526/125; 526/348.6; 502/104; 502/226
[58] Field of Search ................... 526/73, 125, 348.6, 526/905

[56] References Cited

U.S. PATENT DOCUMENTS

| | | | |
|---|---|---|---|
| 3,392,213 | 7/1968 | Berger | 526/905 |
| 3,920,621 | 11/1975 | Baxmann et al. | 526/73 |
| 4,357,448 | 11/1982 | Tsubaki et al. | 526/66 |

*Primary Examiner*—Joseph L. Schofer
*Assistant Examiner*—Fred M. Teskin
*Attorney, Agent, or Firm*—Sughrue, Mion, Zinn, Macpeak, and Seas

[57] ABSTRACT

A method of copolymerization in suspension of ethylene with straight-chain alpha-olefins so as to obtain low-density copolymers in two copolymerization steps in an aliphatic hydrocarbon medium having a boiling point above 40° C. In the first reaction step the medium is supplied with a high-activity Ziegler catalyst on a carrier and with ethylene and the alpha-olefin. The copolymerization reaction is carried out for between 20 seconds and 30 minutes and at a temperature between 45° and 65°. The resulting copolymer is used in the second reaction step as a nucleus for polymerizing ethylene and the alpha-olefin, the reaction medium being supplied with additional quantities of ethylene and alpha-olefins so as to maintain the concentration of alpha-olefin in the reaction medium at between 4 and 25% by weight per 100 parts by weight of reaction medium and so as to maintain the pressure of ethylene at between 5 and 25 bars, the reaction being performed at a temperature between 50° and 80° C. for between 1 and 3 hours.

4 Claims, No Drawings

METHOD OF COPOLYMERIZATION IN SUSPENSION OF ETHYLENE WITH STRAIGHT-CHAIN ALPHA-OLEFINS TO OBTAIN LOW-DENSITY COPOLYMERS

The invention relates to a method of copolymerization in suspension of ethylene with straight-chain alpha-olefins to obtain low-density copolymers.

"Low density" means an absolute density below 0.940 g/ml as measured by the ASTM D 1505 method.

Ethylene and alpha-olefins copolymers having the aforementioned densities and a straight-chain structure, i.e. with few branches and at statistically regular distances along the chain of carbon atoms, are commonly called "low-density straight-chain polyethylenes".

Low-density straight-chain polyethylene is becoming increasingly important in the olefin polymer sector in that it combines the straight-chain characteristics of ethylene polymers obtained with Ziegler catalysts at low pressure, with density values similar to those of ethylene polymers obtained by processes operating at high pressure. This can reduce the cost of subsequent manufacturing operations owing to the smaller weight of polymer required to obtain components of given volume.

However, there are considerable technical difficulties in obtaining low-density straight-chain polyethylene.

More particularly, the preparation of low-density straight-chain polyethylene in suspension in aliphatic solvents by copolymerization of ethylene with straight-chain alpha-olefins is difficult owing to the considerable variation in the dissolving power of the choosen aliphatic hydrocarbon due to solubilization of the alpha-olefin used as co-monomer in the solvent and the increased solubility of the copolymer because of its structure.

Since the reactivity of ethylene is appreciably higher than that of the other mono-olefins and it is therefore necessary to operate with very high alpha-olefin/ethylene ratios, copolymerization in practice is carried out in a reaction medium which is not aliphatic hydrocarbon but a mixture thereof with alpha-olefin, particularly in the case of alpha-olefins containing more than 4 carbon atoms.

This reaction medium solubilizes the copolymers to an extent which increases in proportion to the quantity of alpha-olefin in the structure. This greatly increases its viscosity, resulting in great difficulties in heat exchange in the copolymerization reactors or in controlling the parameters for adjusting the desired products.

In addition, the product is difficult to separate by filtration and, when dry, is not free-flowing, resulting in difficulties during subsequent phases of use.

Prior-art methods proposed for obviating these serious disadvantages are based on the use of aliphatic hydrocarbon solvents boiling at or below 40° C. and operating in a number of polymerization steps, in the first of which however an ethylene homopolymer is formed and is used as a "seed" for subsequent copolymerization of ethylene with alpha-olefin, e.g. according to British Patent Specification Nos. 1.526.606 and 1.532.332.

Low-boiling solvents can be used to reduce solubilization and the swelling of the polymers, thus reducing the viscosity of the medium.

However, low-boiling solvents introduce a number of technical difficulties in the process, e.g. the need to operate at high above-atmospheric pressure during the recovery of solvents and the need for expensive cooling of the heat-exchange fluids so as to condense the solvents during the recovery phase.

The most serious defect, however, of this kind of process is that the material obtained are not completely homogeneous, since a certain quantity of homopolymer is always present.

For example, the large difference in density between the various polymerization products and the difference in crystallization rates results in reduced transparency of the films obtained from the copolymers, even if the amount of homopolymer present is small.

Another method for obviating the aforementioned disadvantages is based on copolymerization in a fluidized bed, where the particles forming the bed to be fluidized are the same copolymer as previously formed, e.g. according to U.S. Pat. No. 4.293.673.

This method of copolymerization, however, requires a plant suitable for working in the gas/solid phase and is inapplicable to all existing plants which polymerize olefins in suspension in hydrocarbon solvents.

It has now been found, according to the main feature of the invention, that copolymers of ethylene and alpha-olefins having 3 to 8 carbon atoms can be obtained while avoiding or substantially reducing the aforementioned disadvantages, if ethylene is copolymerized with alpha-olefins in suspension in an aliphatic hydrocarbon medium containing 6 to 8 carbon atoms in the presence of a Ziegler catalyst carried on magnesium chloride and having high catalytic activity, the reaction being in two steps:

In the first step the catalyst, ethylene and alpha-olefin are introduced into the reaction medium and the copolymerization reaction is carried out at a temperature between 45° and 65° C. at a pressure between 2 and 6 bars for a time between 20 seconds and 30 minutes; in the second step the supply of ethylene and alpha-olefin is continued without further addition of catalyst, the pressure being maintained at between 5 and 25 bars and the temperature at between 50° and 80° C. for a time between 1 and 3 hours.

In both steps, the molecular weight of the resulting copolymer is adjusted by hydrogen, by the method of operation widely known to the skilled in the art.

The preferred catalysts for performing the invention are: alkyl aluminium or alkyl aluminium halide and a solid catalytic component with large to very large pore dimensions, obtained by interaction between a titanium halide and the solid, micro-spheroidal product obtained by spray drying a solution of magnesium chloride in ethanol or in a mixture of ethanol and a higher-boiling solvent, as described in Italian PA No. 21881 A/81 filed on Mar. 21, 1981, and PA No. 21805 A/82, filed on June 10, 1982.

With regard to the alpha-olefin used it is known that its reactivity in co-ordinate anionic polymerization varies greatly with the type of alpha-olefin and decreases when its molecular weight increases.

In order for example to obtain polymers having a density between 0.935 and 0.910 g/ml at a reaction pressure of 11 bars in the presence of $H_2$, the amount of 1-butene in the reaction medium is between 10% and 25%; whereas in the case of propene copolymers the amount is between 5% and 15%.

According to a basic feature of the invention, catalyst is introduced in the first copolymerization step only and in the second step the catalyst arrives with the copolymer obtained in the first step.

According to another essential feature of the invention, the concentration of alpha-olefin in the reaction medium is maintained at values not above 25% and not below 4% by weight.

If there is more than 25% of alpha-olefin in the reaction medium there is an excessive increase in solubility of copolymers of density below 0.910 g/ml, with a consequent increase in the viscosity of the suspension and difficulties which may become intolerable in an efficient process.

If on the other hand the concentration of alpha-olefin in the reaction medium is below 4%, the copolymers contain too little alpha-olefin and therefore have a density above 0.940 g/ml.

In the preferred embodiments of the invention, the concentration of alpha-olefin is kept between 4% and 7% by weight in the first reaction step and between 15% and 20% in the second step.

Under these conditions the amount of copolymer solubilized by the reaction medium does not exceed 10% by weight of the total copolymer obtained.

The copolymer obtained in the first reaction step is typically from 3% to 7% of the total copolymer obtained by the method according to the invention and its alpha-olefin content is between 1.5% and 3% by weight.

In a preferred embodiment of the method, the first polymerization step is carried out with only part of the total solvent, typically 10% to 30% of the total amount.

The concentration of copolymer in the first step does not represent a limit, but is preferably not above 350 g/l and not below 30 g/l.

In the preferred embodiment of the invention the concentration of copolymer in the first step is kept between 40 and 80 g/l.

The invention can also be worked at pressures below 11 bars in suspension of hydrocarbons such as commercial hexane and heptane to obtain straight-chain polyethylenes having a density between 0.935 and 0.910 g/ml; the resulting copolymer is easily filterable and, after drying, is a free-flowing powder which can be added and converted into manufactured articles by conventional processing systems. The uniformity of the polymer is also shown by the low percentage of polymers dissolved in the solvent (always below 10%) thus avoiding the difficulties of the previously-mentioned techniques.

If for example polymerization is carried out at 62° C. by the two-step method according to the invention, the resulting product has a density of 0.923 g/ml and the amount of polymer soluble at 40° C. is 8%, considerably lower than the 26.8% obtained in the known method.

Copolymers produced according to the invention have well-defined physical and rheological characteristics suitable for production of films, e.g. polymers with a melt index (M.I.) of 1.0 to 2.0 g/10' at 190° C. and a shearing force sensitivity of 24 to 30 (the shearing force sensitivity means the ratio of the M.I. value at 20 kg to the value at 2.16 kg).

Polymers obtained according to the invention, in contrast to those obtained in high-pressure processes, are free from long-branch chains and have suitable properties for conversion to manufactured articles by conventional processing techniques such as molding and injection, blowing and extrusion.

The structural, physical and rheological characteristics of the products obtained in the following examples were determined by methods widely known and used in the laboratory. The density and fluidity index were measured by the ASTM methods mentioned in the Examples. The amount of branching (and therefore the amount of comonomer present in the copolymer) was determined by infra-red spectrography based on the absorption band at 1378 cm$^{-1}$ due to methyl groups, using the method of compensating the absorption due to the methylene groups.

EXAMPLE 1

Commercial magnesium chloride was dissolved in ethanol at 60° C. until the concentration of the salt was 160 g/l.

The resulting solution was supplied to a NIRO spray dryer which was also supplied with gaseous nitrogen at an inlet temperature of 280° C. and an outlet temperature of 180° C.

Under these conditions a micro-spheroidal solid was obtained having a size range from 10 to 40 microns and having the following characteristics:

| | |
|---|---|
| Ethanol content: | 16% by weight |
| Specific surface: | 3.5 m$^2$/g |
| Porosity: | 0.9 ml/g |
| Average pore radius: | about 10 000 Å |

10 g of this micro-spheroidal solid was placed in contact with 4 ml titanium tetrachloride diluted with 100 ml n-heptane and reacted at 95° C. for 30 minutes. At the end of this time, the solid was separated by filtration and reheated to 100° C. to remove substantially all the n-heptane.

The resulting catalyst component had particle sizes similar to the carrier and the following other characteristics:

| | |
|---|---|
| Titanium (metal) content: | 2.3% by weight |
| Specific surface: | 30 m$^2$/g |
| Porosity: | 1 ml/g |
| Average pore radius: | same as for carrier |

EXAMPLE 2

6 g of the catalyst component prepared as described in the Example 1 was placed in contact with 30 g triethyl aluminium in a flask with an agitator in the presence of 164 g anhydrous heptane in an inert atmosphere.

The temperature of the mixture was kept at 40° C. for 30 minutes, thus obtaining a catalyst suspension for use in polymerization.

Polymerization was carried out in two steps:

First step: 166 g anhydrous heptane and 1.5 g catalytic suspension prepared as hereinbefore were introduced into a three-liter autoclave fitted with an agitator and previously flushed out with nitrogen.

The temperature was brought to 60° C. and the pressure to 4 bars with hydrogen, after which 37.5 ml of a solution of 20% by weight of 1-butene in anhydrous heptane was introduced in through a micropump, after which the autoclave pressure was brought to 7 bars with ethylene.

The pressure was kept at this value for 20 seconds followed by cooling and the autoclave was quickly degassed, yielding 20 g of copolymer having a density of 0.9430 g/ml (ASTM D 1505) and a 1-butene content of 1.95% (IR determination).

Second stage: After flushing the autoclave with nitrogen, 745 g of heptane was introduced together with hydrogen up to a pressure of 3.82 bars and 189 g of liquid 1-butene through a pump and ethylene up to a total pressure of 10 bars.

Under these conditions, polymerization was carried out for 2 hours at 62° C., keeping the pressure constant and supplying ethylene together with 30 g of 1-butene, introduced through a pump through the same pipe as the ethylene.

Finally the suspension was discharged and filtered at 40° C. through a laboratory Buchner funnel and the characteristics of the polymer were determined. The results are shown in summary form in Table 1, Example 2.

EXAMPLE 3 (comparison with EXAMPLE 2)

For comparison, polymerization was carried out without the first step.

911 g heptane was introduced into the autoclave together with 1.50 g catalytic suspension prepared as in the first part of Example 2, hydrogen up to a total pressure of 3.82 bars, 190 g of liquid 1-butene and ethylene until the pressure was 10 bars.

Polymerization was carried out at 62° C. for 2.0 hours, keeping the pressure constant during the introduction of ethylene. During the test a further 17 g of 1-butene were introduced into the autoclave through a proportioning pump.

The suspension discharged at the end was practically impossible to filter and the sedimentation rate was extremely slow.

The polymer was recovered with difficulty and its characteristics were determined. The results are summarized in Table 1.

TABLE 1

|  |  | Ex. 2 | Ex. 3 |
| --- | --- | --- | --- |
| Total polymer produced: | g | 343.3 | 189 |
| Polymer, 1st step | (%) | 5.82 |  |
| Total polymer Content of 1-butene (IR) | (%) | 7.6 | 7.45 |
| Content of Ti | ppm | 3 | 5.4 |
| Absolute density, ASTM D1505 | g/ml | 0.9230 | 0.9236 |
| Melting index, ASTM D1238 | g/10' | 1.15 | 1.25 |
| Properties of powder |  | free flowing | Rubbery block |
| Density of powder | g/ml | 0.30 | Not measurable |
| Particle size | >2 mm | 5.8% | Not measurable |
|  | <0.5 mm | 1.0% |  |
| *Soluble PE/ total PE |  | 7.1% | >20% |

*Polyethylene dissolved in solvent at 40° C. as a proportion of total polyethylene

EXAMPLE 4

First-step polymerization was carried out as in Example 2, using the quantity of catalyst indicated there.

At the end of this step, 750 g of anhydrous heptane were introduced into the autoclave together with 174.3 g 1-butene and hydrogen until the partial pressure was equal to 3.82 bars. Ethylene was then introduced to bring the autoclave pressure to 10 bars, the pressure being kept constant during the test.

The test lasted 2 hours at a temperature of 62° C., 26.7 g of 1-butene being introduced together with the ethylene.

At the end the suspension was discharged and filtered and the polymer characteristics were determined, the results being shown in Table 2, Example 4.

EXAMPLE 5

First-step polymerization was carried out as in Example 2, using the same quantity and type of catalyst. At the end of this step, 896 g of 16.3% solution of 1-butene in anhydrous heptane was rapidly introduced, together with hydrogen until the partial pressure was equal to 3.82 bars.

Ethylene was then introduced, bringing the autoclave pressure to 10 bars, which was kept constant.

The test was continued for 2 hours at 62° C. introducing 17 g of 1-butene together with ethylene.

Finally, the suspension was discharged, filtered and the polymer characteristics were determined, the results being shown in Table 2.

TABLE 2

|  |  | Ex. 4 | Ex. 5 |
| --- | --- | --- | --- |
| Total polymer produced | (g) | 357.2 | 383.2 |
| Polymer, 1st step | (%) | 5.6 | 5.2 |
| Total polymer Content of 1-butene (IR) | (%) | 6.5 | 4.2 |
| Content of titanium | (ppm) | 2.8 | 2.6 |
| Absolute density, ASTM D1505 | (g/ml) | 0.9250 | 0.9300 |
| Melting index, ASTM D1238 | (g/10') | 1.11 | 1.03 |
| Sensitivity to shearing force | (*) | 24.7 | 25.4 |
| Characteristics of powder |  | free flowing | free flowing |
| Density of powder in mass | (g/ml) | 0.26 | 0.31 |
| Soluble P.E./Total P.E. |  | 5.5% | 2.8% |

(*) Ratio between the melting indices measured at a weight of 20 kg and at 2.16 kg at 190° C.

EXAMPLE 6

Commercial magnesium chloride (1 part by weight) was added to a mixture of ethanol (6 parts by weight) and straight-chain $C_{10}$–$C_{14}$ paraffin (6 parts by weight). The mixture was heated until the magnesium chloride crystals disappeared and an emulsion formed, which was spray-dried in a laboratory apparatus, which was also supplied with a flow of gaseous nitrogen at an inlet temperature of 370° C. and an outlet temperature of 250° C.

Under these conditions a micro-spheroidal solid was obtained with a size range of 10–50 microns and the following characteristics:

| Ethanol content: | 10% by weight |
| --- | --- |
| Specific surface: | 35 m²/g |
| Porosity: | 2.5 ml/g |
| Average pore radius: | about 30 000 Å |

10 g of the microspheroidal solid were placed in 200 g $C_{10}$–$C_{14}$ paraffin containing 10 ml titanium tetrachloride.

The mixture was heated to 100° C. for 20 minutes and cooled and the solid was filtered and washed with $C_{10}$–$C_{14}$ paraffin until the chlorine ion disappeared.

In this manner, the catalyst component was obtained with particle sizes similar to those of the carrier and having the following characteristics:

| Content of titanium (metal): | 1.8% by weight |
| --- | --- |
| Specific surface: | 90 m²/g |
| Porosity: | 2.1 ml/g |
| Average pore radius: | Similar to that of the carrier |

EXAMPLE 7

6 g of a catalyst component prepared as described in Example 6 were placed in contact with 24 g triethyl aluminium in a flask with agitator in the presence of 170 g anhydrous hexane in an inert atmosphere.

The temperature of the mixture was kept at 50° C. for 20 minutes, thus obtaining the catalyst suspension for use in polymerization.

By the same method as in Example 2, 142 g of anhydrous hexane and 1.5 of catalyst suspension prepared as hereinbefore were introduced into the autoclave. The temperature was brought to 50° C. and the pressure to 2.4 bars with $H_2$. 45.5 ml of a 20% solution of 1-butene in anhydrous hexane was introduced, followed by ethylene up to a pressure of 5 bars. Polymerization was stopped after 30 seconds, obtaining 13.2 g copolymer having the following characteristics:

| Density (ASTM D 1505): | 0.9425 g/ml |
| --- | --- |
| Content of 1-butene (IR): | 2.1% |

After flushing with nitrogen, 745 g liquid iso-octane was introduced through a pump, together with hydrogen up to a pressure of 5.8 bars, 181.5 g of 1-butene and ethylene to bring the total pressure to 16 bars.

Polymerization was carried out at 75° C., ethylene being introduced together with 23 g of 1-butene in 1.5 hours.

Finally, after separating the iso-octane and the unreacted 1-butene, 290 g of polymer were obtained.

| Absolute density, ASTM D 1505: | 0.9220 g/ml |
| --- | --- |
| Ti content: | 2.7 ppm |
| 1-butene content (IR): | 8.3% |
| 1st-step polymer/ total polymer: | 4.55.% |

EXAMPLE 8

A method similar to that described in the first part of Example 7 was used to obtain 10.2 g of ethylene/1-butene copolymer in the first polymerization step.

745 g of anhydrous hexane was then introduced into the autoclave together with hydrogen up to a pressure of 4.5 bars, 185 g of 1-butene and ethylene bringing the total pressure to 11 bars. Polymerization was carried out at 70° C., ethylene being introduced together with 37 g of 1-butene during a two-hour period.

The suspension was finally filtered at 40° C. and the polymer was dried and its characteristics were determined, the result being as shown in Table 3.

EXAMPLE 9 (comparative example)

By way of comparison, ethylene/1-butene copolymerization was carried out in a single step. 911 g of hexane was supplied directly to the autoclave together with 1.5 g of catalyst suspension prepared as in Example 7, hydrogen up to a pressure of 4.5 bars, 191 g of 1-butene and ethylene up to a pressure of 11 bars.

Polymerization was carried out at 50° C. for 3 hours, 35 g of 1-butene being introduced with the ethylene.

At the end, the discharge suspension was difficult to filter and was extremely slow to settle.

The characteristics of the recovered polymer were determined, the results being shown in Table 3.

TABLE 3

|  |  | Ex. 8 | Ex. 9 |
| --- | --- | --- | --- |
| Test temperature |  | 70° C. (2 steps) | 50° C. (1 step) |
| Total polymer produced | (g) | 329.5 | 302 |
| Polymer, 1st step | (%) | 4.0 | — |
| Total polymer Content of 1-butene | (%) | 9.7 | 9.5 |
| Content of Ti | (ppm) | 2.4 | 2.6 |
| Absolute density, ASTM 1505 | (g/ml) | 0.9195 | 0.9200 |
| Melting index, ASTM D1238 | (g/10') | 1.0 | 1.05 |
| Sensitivity to shearing force |  | 25.0 | 24.8 |
| Characteristics of powder: |  | free flowing | free flowing |
| Density of powder in mass | (g/ml) | 0.30 | 0.30 |
| Soluble P.E./Total P.E. | (%) | 10.0 | 12.2 |

EXAMPLE 10

First-step polymerization was carried out as in Example 7, using the same quantity of catalyst.

At the end, 725 g anhydrous heptane were introduced into the autoclave together with 104 g 1-butene and hydrogen until its partial pressure was equal to 4 bars.

Ethylene was then introduced, bringing the autoclave pressure to 10.6 bars, which was kept constant during the test.

Polymerization was continued for 2 hours at a temperature of 60° C., 35 g of 1-butene being introduced together with ethylene.

Finally the suspension was discharged and filtered and the polymer characteristics were determined.

| Product: | (g) | 202 |
| --- | --- | --- |
| Absolute density, ASTM D 1505: | (g/ml) | 0.9158 |
| Titanium content: | (ppm) | 4 |
| Butene content (IR) | (%) | 12.5 |
| 1st-step PE/total PE | (%) | 6.5 |

EXAMPLE 11

First-step polymerization was carried out as in Example 7 using the same quantity of catalyst but replacing 1-butene by 8 g of 1-hexene.

At the end of the first step 735 g hexane was introduced into the autoclave together with hydrogen up to a pressure of 4.4 bars and 210 g of 1-hexene.

Ethylene was then introduced, bringing the autoclave pressure to 10.5 bars and keeping it constant during the test.

Polymerization was continued for 2 hours at 65° C.

Finally, the suspension was discharged and filtered and the polymer characteristics were determined.

| Product | (g) | 300 |
| --- | --- | --- |
| Absolute density (ASTM D 1505) | (g/ml) | 0.932 |
| Titanium content | (ppm) | 2.7 |
| Content of 1-hexene (IR) | (%) | 3.2 |

-continued

| 1st-step PE/Total PE | (%) | 4.4 |
| --- | --- | --- |

I claim:

1. A method of copolymerization in suspension of a liquid aliphatic hydrocarbon reaction medium containing 6 to 8 carbon atoms, gaseous ethylene and at least one alpha-olefin having 3 to 8 carbon atoms to obtain copolymers having a density below 0.940 g/ml, wherein copolymerization is carried out in the presence of a Ziegler catalyst carried on a solid, microspheroidal product obtained by spray drying a solution of magnesium chloride in ethanol or a mixture of ethanol and a higher boiling point solvent and having high catalytic activity, characterized in that:
   (a) the gaseous ethylene, at least one alpha-olefin and catalyst are introduced into the reaction medium and a first reaction step is carried out at a temperature between 45° and 65° at a pressure of 2 to 6 bars for 20 seconds to 30 minutes,
   (b) the resulting copolymer suspension is then subjected to a second reaction step which is carried out at a temperature between 50° and 80° C. and at a pressure of 5 to 25 bars for between 1 and 3 hours, wherein the reaction medium is supplied with ethylene and alpha-olefin and, if required, with further quantities of solvent but not with further quantities for catalyst,
   (c) the amount of alpha-olefin supplied during the first step is adjusted so as to maintain the concentration of alpha-olefin in the reaction medium at between 4% and 7% by weight,
   (d) the amount of alpha-olefin supplied during the second reaction step is adjusted so as to maintain the concentration of alpha-olefin in the reaction medium at between 15% and 20% by weight,
   (e) the copolymer obtained from the hydrocarbon suspension is recovered by conventional separation means and the product is dried without any process for destroying or eliminating the catalyst.

2. A method according to claim 1, characterised in that 70% to 90% of the hydrocarbon solvent is added to the reaction medium during the second reaction step.

3. A method according to claim 1, characterised in that the copolymer obtained in the first step represents 3% to 7% of the total copolymer obtained by the process.

4. A method according to claim 3, characterized in that the copolymer obtained in the first step contains from 1.5% to 3% by weight of alpha-olefin.

* * * * *